US011887150B2

(12) United States Patent
Badger et al.

(10) Patent No.: US 11,887,150 B2
(45) Date of Patent: Jan. 30, 2024

(54) SYSTEMS AND METHODS FOR ATTRIBUTING ELECTRONIC PURCHASE EVENTS TO PREVIOUS ONLINE AND OFFLINE ACTIVITY OF THE PURCHASER

(71) Applicant: Worldpay, LLC, Symmes Township, OH (US)

(72) Inventors: Brent Badger, Powell, OH (US); Dennis Kettler, Lebanon, OH (US)

(73) Assignee: Worldpay, LLC, Symmes Township, OH (US)

(*) Notice: Subject to any disclaimer, the term of this patent is extended or adjusted under 35 U.S.C. 154(b) by 0 days.

(21) Appl. No.: 17/205,286

(22) Filed: Mar. 18, 2021

(65) Prior Publication Data

US 2021/0209637 A1    Jul. 8, 2021

Related U.S. Application Data

(63) Continuation of application No. 15/382,069, filed on Dec. 16, 2016, now Pat. No. 11,017,427.

(51) Int. Cl.
*G06Q 10/00* (2023.01)
*G06Q 30/0242* (2023.01)
(Continued)

(52) U.S. Cl.
CPC ......... *G06Q 30/0244* (2013.01); *G06F 16/22* (2019.01); *G06Q 30/0201* (2013.01);
(Continued)

(58) Field of Classification Search
None
See application file for complete search history.

(56) References Cited

U.S. PATENT DOCUMENTS 8,583,498 B2 * 11/2013 Fried .................. G06Q 20/4016
340/5.82
8,606,719 B2 * 12/2013 Oliver ................ H04L 63/0807
705/40
(Continued)

OTHER PUBLICATIONS

Paul, Michael, 8 Ways Retailers Are Tracking Your Every Move, Sep. 23, 2016, Money.com, https://money.com/how-retailers-track-you/, p. 1-19. (Year: 2016).*
(Continued)

*Primary Examiner* — Joseph M Waesco
(74) *Attorney, Agent, or Firm* — Bookoff McAndrews, PLLC

(57) ABSTRACT

Systems and methods are disclosed for attributing payment vehicle purchase events to previous activity of a purchaser. One method comprises: receiving purchase information associated with a purchase event by a purchaser; comparing the received purchase information to a profile data store to identify a purchaser profile associated with the purchaser, the profile data store comprising a plurality of purchaser profiles, wherein each purchaser profile comprises payment vehicle data and a tracking element; determining the tracking element of the identified purchaser profile; identifying one or more activities of the purchaser using the tracking element of the identified purchaser profile; for each of the identified one or more activities, assessing the strength of attributing the purchase event to the activity, using environmental and/or behavioral data associated with the tracking element; and determining whether to attribute the purchase event to one or more of the identified activities based on the assessment.

20 Claims, 9 Drawing Sheets

(51) Int. Cl.
*G06Q 40/02* (2023.01)
*G06Q 30/0601* (2023.01)
*G06Q 30/0201* (2023.01)
*G06Q 30/0241* (2023.01)
*G06F 16/22* (2019.01)

(52) U.S. Cl.
CPC ..... *G06Q 30/0277* (2013.01); *G06Q 30/0601* (2013.01); *G06Q 40/02* (2013.01)

(56) References Cited

U.S. PATENT DOCUMENTS

| | | | |
|---|---|---|---|
| 9,681,359 B2* | 6/2017 | Ramalingam | H04W 12/08 |
| 2011/0087519 A1* | 4/2011 | Fordyce, III | G06Q 30/02 |
| | | | 705/7.29 |
| 2011/0093327 A1* | 4/2011 | Fordyce, III | G06Q 30/0224 |
| | | | 705/14.66 |
| 2011/0231225 A1* | 9/2011 | Winters | G06Q 30/0269 |
| | | | 705/7.29 |
| 2011/0231257 A1* | 9/2011 | Winters | G06Q 30/0255 |
| | | | 705/14.53 |
| 2011/0231258 A1* | 9/2011 | Winters | G06Q 30/02 |
| | | | 705/14.53 |
| 2011/0231305 A1* | 9/2011 | Winters | G06Q 30/02 |
| | | | 705/1.1 |
| 2012/0109734 A1* | 5/2012 | Fordyce, III | G06Q 30/0239 |
| | | | 705/14.25 |
| 2013/0151388 A1* | 6/2013 | Falkenborg | G06Q 40/02 |
| | | | 705/35 |
| 2013/0191195 A1* | 7/2013 | Carlson | G06Q 30/0224 |
| | | | 705/14.58 |
| 2013/0191198 A1* | 7/2013 | Carlson | G06F 9/468 |
| | | | 705/14.23 |
| 2013/0191213 A1* | 7/2013 | Beck | G06Q 30/0207 |
| | | | 705/14.64 |
| 2013/0197991 A1* | 8/2013 | Basu | G06Q 20/384 |
| | | | 705/14.39 |
| 2013/0204703 A1* | 8/2013 | Carlson | G06Q 30/0214 |
| | | | 705/14.56 |
| 2013/0218664 A1* | 8/2013 | Carlson | G06Q 30/0244 |
| | | | 705/14.43 |
| 2013/0218670 A1* | 8/2013 | Spears | G06Q 30/0248 |
| | | | 705/14.47 |
| 2013/0346264 A1* | 12/2013 | Falkenborg | G06Q 40/02 |
| | | | 705/30 |
| 2014/0006309 A1* | 1/2014 | Reisman | G06Q 30/02 |
| | | | 705/347 |
| 2014/0074687 A1* | 3/2014 | Halpern | G06Q 40/02 |
| | | | 705/38 |
| 2014/0172625 A1* | 6/2014 | Reisman | G06Q 30/0282 |
| | | | 705/26.7 |
| 2015/0332291 A1* | 11/2015 | Gillooly | G06Q 30/0201 |
| | | | 705/7.29 |
| 2016/0012452 A1* | 1/2016 | Unser | G06Q 30/0201 |
| | | | 705/7.29 |
| 2016/0012457 A1* | 1/2016 | Unser | G06Q 10/063 |
| | | | 705/7.29 |
| 2016/0063546 A1* | 3/2016 | Ghosh | G06Q 30/0255 |
| | | | 705/14.53 |
| 2017/0098234 A1* | 4/2017 | Carlson | G06Q 30/0215 |
| 2017/0201779 A1* | 7/2017 | Publicover | H04N 21/4532 |

OTHER PUBLICATIONS

Axon, Tadd, Understanding and Selecting a Tokenization Solution, Oct. 27, 2010, Securosis, https://securosis.com/assets/library/reports/Securosis_Understanding_Tokenization_V.1_0_.pdf, p. 1-33.

* cited by examiner

SYSTEMS AND METHODS FOR ATTRIBUTING ELECTRONIC PURCHASE EVENTS TO PREVIOUS ONLINE AND OFFLINE ACTIVITY OF THE PURCHASER

CROSS-REFERENCE TO RELATED APPLICATION(S)

This patent application is a continuation of and claims the benefit of priority to U.S. application Ser. No. 15/382,069, filed Dec. 16, 2016, the entirety of which is incorporated herein by reference.

FIELD OF DISCLOSURE

The present disclosure relates generally to the field of field of determining a correlation between online advertising campaigns or online activity and subsequent purchase events.

BACKGROUND

Many companies utilize a variety of different marketing campaigns to attract new business, increase revenue, or serve other business needs. For example, it is not uncommon for companies to advertise through multiple marketing channels, such as TV, radio, Internet, and so forth. With specific regard to Internet-based or electronic marketing, it is often difficult for these companies to correlate advertising and marketing expenditures to subsequent purchase events, especially when those purchase events occur through different sales channels or occur subsequent to a consumer's initial exposure to marketing communications. Thus, there is a desire for systems and methods configured to better correlate advertising and marketing expenditures to subsequent purchase events.

SUMMARY

According to certain aspects of the present disclosure, systems and methods are disclosed for attributing payment vehicle purchase events to previous activity by the purchaser.

In one embodiment, a computer-implemented method is disclosed for attributing payment vehicle purchase events to previous activity of a purchaser. The method includes: receiving, by a profiler computing system, purchase information associated with a purchase event by a purchaser; comparing, by the profiler computing system, the received purchase information to a profile data store to identify a purchaser profile associated with the purchaser, the profile data store comprising a plurality of purchaser profiles, wherein each purchaser profile comprises payment vehicle data and a tracking element; determining, by the profiler computing system, the tracking element of the identified purchaser profile; identifying one or more activities of the purchaser using the tracking element of the identified purchaser profile; for each of the identified one or more activities, assessing the strength of attributing the purchase event to the activity, using environmental and/or behavioral data associated with the tracking element of the identified purchaser profile; and determining, by the profiler computing system, whether to attribute the purchase event to one or more of the identified activities of the purchaser based on the assessment.

In accordance with another embodiment, a system is disclosed for attributing payment vehicle purchase events to previous activity of a purchaser. The system comprises: a data storage device storing instructions for attributing payment vehicle purchase events to previous activity of the purchaser; and a profiler computing system configured to execute the instructions to perform a method including: receiving purchase information associated with a purchase event by a purchaser; comparing the received purchase information to a profile data store to identify a purchaser profile associated with the purchaser, the profile data store comprising a plurality of purchaser profiles, wherein each purchaser profile comprises payment vehicle data and a tracking element; determining the tracking element of the identified purchaser profile; identifying one or more activities of the purchaser using the tracking element of the identified purchaser profile; for each of the identified one or more activities, assessing the strength of attributing the purchase event to the activity, using environmental and/or behavioral data associated with the tracking element of the identified purchaser profile; and determining whether to attribute the purchase event to one or more of the identified activities of the purchaser based on the assessment.

In accordance with another embodiment, a non-transitory machine-readable medium stores instructions that, when executed by a profiler computing system, causes the profiler computing system to perform a method for attributing payment vehicle purchase events to previous activity of a purchaser. The method includes: receiving, by a profiler computing system, purchase information associated with a purchase event by a purchaser; comparing, by the profiler computing system, the received purchase information to a profile data store to identify a purchaser profile associated with the purchaser, the profile data store comprises a plurality of purchaser profiles, wherein each purchaser profile comprises payment vehicle data and a tracking element; determining, by the profiler computing system, the tracking element of the identified purchaser profile; identifying one or more activities of the purchaser using the tracking element of the identified purchaser profile; for each of the identified one or more activities, assessing the strength of attributing the purchase event to the activity, using environmental and/or behavioral data associated with the tracking element of the identified purchaser profile; and determining, by the profiler computing system, whether to attribute the purchase event to one or more of the identified activities of the purchaser based on the assessment.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
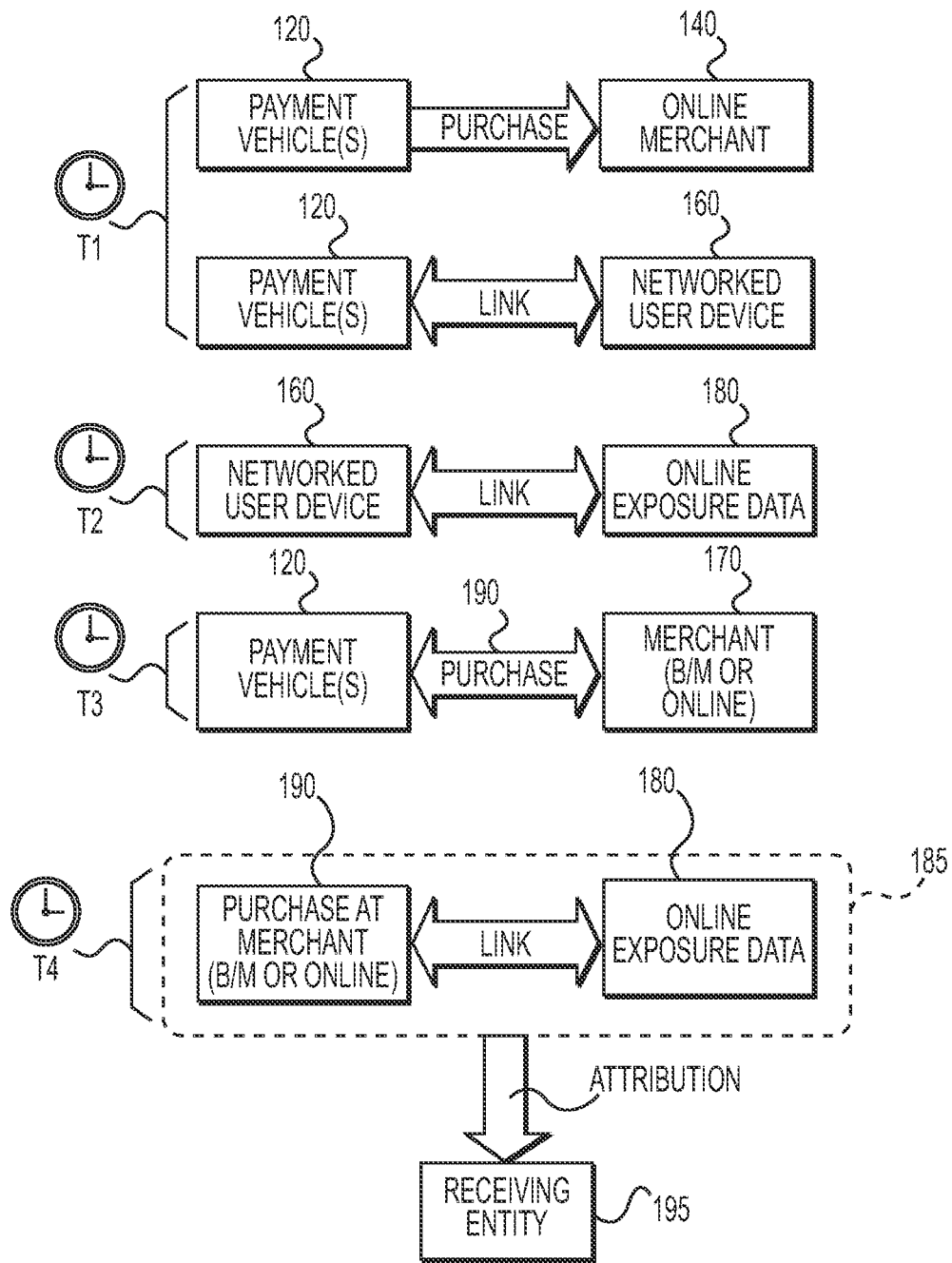
FIG. 1 schematically depicts example linkages that can be determined in accordance with various non-limiting embodiments.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client server distributed systems, and can use other protocols, or operate at other layers in communication protocol stacks, than are described.

Many companies utilize a variety of different marketing campaigns to attract new business, increase revenue, or serve other business needs. Many companies engage in advertising through multiple marketing channels, such as TV, radio, Internet, and so forth. With specific regard to Internet-based marketing, it is often difficult for these companies to correlate advertising and marketing expenditures to subsequent purchase events, especially when those purchase events occur through different sales channels or occur subsequent to a consumer's initial exposure to marketing communications. By way of example, a typical consumer may spend time visiting or otherwise interacting with a merchant's website to research a particular good and/or service, referred to herein as "product." The consumer may arrive at the merchant's website through "clicking through" an advertisement appearing on a webpage or within a mobile application, through keyword searching, or through other means. The consumer may decide to the buy the product though the merchant's ecommerce portal during that visit to the merchant's website. Such purchase events are generally traceable by the merchant, or an affiliated entity, such that a correlation between the consumer's online activity and the purchase event can be tracked and identified as a successful "conversion." However, in other instances, instead of purchasing the product in an online transaction, the consumer may decide to physically travel to a brick-and-mortar retail location of the merchant and purchase the product. In some embodiments, a purchase event may refer to, e.g., a purchase activity related to a transaction or prospective transaction with a merchant and/or category of merchants and/or a purchase activity relating to a transaction or prospective transaction over a good, service, and/or stock keeping unit.

Using presently available consumer tracking data, there may be a disconnect between the consumer's online activity and their subsequent purchases at the brick-and-mortar retail location. Nevertheless, it may be desirable for the merchant, or other interested parties, to understand any correlation that exists between the consumer's previous exposure to the merchant's website, or other online activities, and the subsequent purchase of a product at the brick-and-mortar retail location.

In yet other instances, the consumer may decide to leave the merchant's website and then return to the merchant's website at a later point in time to make the purchase. If the consumer arrived at the website the first time by "clicking through" an online advertisement, but arrived at the website the second time through other means (e.g., keyword searching, direct URL input, etc.), the correlation between the two online sessions may not be known to a merchant. More particularly, due to techniques used for tracking online activity by marketers and other data aggregators, when the consumer returns to the website at a later point in time to make the purchase, the online advertisements to which the consumer previously interacted with do not typically get credited for driving that purchase event. Accordingly, it is desirable for merchants to know that a correlation exists between initial interaction with online advertisements and/or other online activities and the subsequent purchase of the product at an ecommerce website during a separate online session.

The presently disclosed system and methods can generally provide a correlation of online activity of a consumer to subsequent purchase events by that consumer. The subsequent purchase events can occur at any type of merchant location, including online/ecommerce merchant locations and brick-and-mortar retail locations. The online activity can include exposure to marketing assets, advertisements, offers, coupons, websites, as well as online searching, and so forth. Such online activity can be tracked and logged by a data aggregator computing system. In some embodiments, at least a portion of the data aggregator functionality is performed by a third party service, such as Google®. Additionally or alternatively, in some embodiments, at least a portion of the data aggregator functionality is performed by the merchant's web servers and/or servers including or providing data aggregation services.

In accordance with the systems and methods described herein, a profile for the consumer can be generated and stored by a profiler computing system subsequent to the consumer making an online purchase. The online purchase can be made through interactions with a networked user device or computing device (e.g., a laptop, a desktop computer, a smart appliance such as a smart television, a mobile phone, or any other mobile device, such as a tablet computer, and so forth). As described in more detail below, during the online purchase event the purchaser can provide transaction data (e.g., purchase information) to a financial transaction services processor of a merchant, including payment vehicle information, over a network.

One example of a financial transaction services processor is Vantiv®. Additionally, other information can be provided to the financial transaction services processor over the network during the course of the transaction and, in some embodiments, can be provided after conclusion of the transaction. Such information can include a tracking element associated with the purchaser and/or the purchaser's networked user device. For example, in some embodiments, the tracking element can be a device identifier of the purchaser's networked user device. This device identifier can be used as part of the fraud prevention services of the financial transaction services processor or the payment networks (e.g., Visa® or MasterCard®).

The device identifier can be, for example, one or more of a source IP address, a MAC address, a device fingerprint, a browser fingerprint, a unique identifier, or any other suitable type of identifier corresponding to the networked user device (e.g., computing device) of the purchaser.

Additionally or alternatively, the tracking element can be an identifier associated with the purchaser. For example, in some embodiments, the tracking element can be embodied as, or otherwise include, an email address, a postal address, a phone number, a loyalty account number, a username, and/or any other unique identifier associated with the purchaser. Additionally, in accordance with the present disclosure, the financial transaction services processor can provide information from the online or initial purchase event to the profiler computing system.

As described in more detail below, the profiler computing system in accordance with the present disclosure can store a profile for the purchaser that generally links that tracking element (e.g., the device ID or purchaser ID) to the payment vehicle used by the purchaser during the online purchase event. In some embodiments, more than one tracking element can be linked to a particular purchaser. Furthermore, as is to be appreciated, in view of PCI requirements, various tokenization techniques can be used to mask personally identifiable information without departing from the scope of the present disclosure. In this regard, if the profiler computing system links a tracking element to a token, it is to be understood that the tracking element is still considered to be linked to the payment vehicle. The profile computer system can continue to augment the purchaser profile over time as additional online transactions are made by the purchaser. For example, if the purchaser initiates a second transaction from the same networked user device using a second payment vehicle, the second payment vehicle can be added to the purchaser's profile. In that way, the second payment vehicle may be linked to the tracking element.

The purchaser can then make a purchase at a merchant location (e.g., a brick-and-mortar retail location). Subsequently, a financial transaction services processor of the merchant can facilitate the communications with various payment networks (e.g., VISA® or MasterCard®), as may be needed, to complete the purchase event. For example, the purchaser can provide a payment vehicle to a point-of-sale system (POS) of the merchant. The POS can, in turn, communicate transactional information (e.g., subsequent purchase information) to the financial transaction services processor. The transactional information can typically include transaction amount, merchant identifier (MID), payment vehicle data, among other information. In accordance with the present disclosure, the financial transaction services processor can provide information from the subsequent purchase event to the profiler computing system. In one embodiment, payment vehicle information is provided to the profiler computing system so that the profile computer system can determine if there is an affiliated (e.g., associated) profile. If there is a profile, the profiler computing system can determine the tracking element, or tracking elements, that are linked to that payment vehicle. As described above, in some embodiments, this linkage can be established during the purchaser's previous online purchases. Additionally or alternatively, the linkage may be established prior to the purchaser making on online purchase. For example, in some embodiments, the linkage may be established based at least in part on, or otherwise as a function of, payment vehicle information maintained in a purchaser's mobile wallet prior to making an online purchase. In any event, using the tracking element and the data collected by the data aggregator computing system, it can be determined if the purchase event at the merchant location (e.g., the brick-and-mortar retail location) can be attributed to any previous online activity of the purchaser. Such attribution can be based on, for example, the transactional information provided to the financial transaction services processor by the POS. For example, in some embodiments, the attribution can be based on the payment vehicle data and/or the MID provided to the financial transaction services processor by the POS.

Once attribution has been determined, various types of reporting can be provided by the profiler computing system. Such reporting can generally attribute various online exposure events to subsequent purchase events. The reporting can be anonymized such that personal identifying information is not provided, but the effectiveness of various online marketing efforts can still be gleaned. Additionally, the reporting can segment or otherwise classify groups of purchasers, purchase events, online activities, or provide other divisions, as may be useful to a merchant, marketer, or other receiving entity. Based on this segmentation, targeted offers or other forms or marketing can be directed to particular groups of purchasers, such as purchasers that visit particular websites, purchasers who visit particular merchants, purchasers who use particular types of payment vehicles, purchasers who perform particular online searches, and so forth.

Accordingly, in view of the systems and methods described herein, and as described in more detail below, a purchaser's purchasing activity can be attributed to the purchaser's previous online activity.

FIG. 1 schematically depicts the linkages that can be determined in accordance with the systems and methods described herein. As depicted by times T1-T4, such linkages can be developed over time, as the information becomes available. Additionally, while not shown, the linkages can also be updated over time, as the underlying data may become stale or inaccurate. Payment vehicle(s) 120 are first used by a purchaser to make a purchase at an online merchant 140. Such purchase can be made by network communications between a networked user device 160 or computing device of the purchaser and the online merchant 140 or through direct communications with the merchant's affiliated financial transaction services processor. In any event, a link can be established between the payment vehicle(s) 120 and the networked user device 160. Prior to, or subsequent to, the linking of the payment vehicle(s) 120 and the networked user device 160, the purchaser can be exposed to online exposure data 180 while interacting with the networked user device 160. Online exposure data 180 is not intended to be limited to any particular type of data, but rather broadly refers to the wide array of information that a purchaser may see, enter, interact with, or otherwise encounter while engaged in online activities. Examples of online exposure data 180 can include, without limitation, URLs visited, links that were clicked, keyword searches performed, online shopping baskets created, electronic advertisement interaction data, electronic marketing interaction data, and so forth. At a later point in time, the purchaser can make a purchase 190 at a merchant 170 using one of the payment vehicles 120. The merchant 170 can be any type of merchant, such as a brick-and-mortar retail location or an ecommerce/web-based merchant. Based on that purchase event, the purchase 190 at the merchant 170 can be linked or attributed to the online exposure data 180, as indicated by attribution 185. Such attribution can be based on, for example, satisfaction of various rules or guidelines for determining attribution. Such rules can include time frames, geographical restraints, and so forth. In one example, in order for a purchase 190 at a merchant 170 to be attributed to online exposure data 180, the purchaser must have had to encounter the online exposure data 180 within a certain time frame (e.g., less than 6 months, less than 3 month, less than 1 month, less than 1 week, and so forth). In this way, restrictive rules for determining attribution can lead to higher confidence levels in the attribution 185. The attribution 185 can ultimately be outputted or otherwise provided to a receiving entity 195. The receiving entity 195 can be, for example, the merchant 170, a data aggregator, a financial transaction services processor, a marketing entity, an analytics entity, or any other interested party.

Figure 2A:
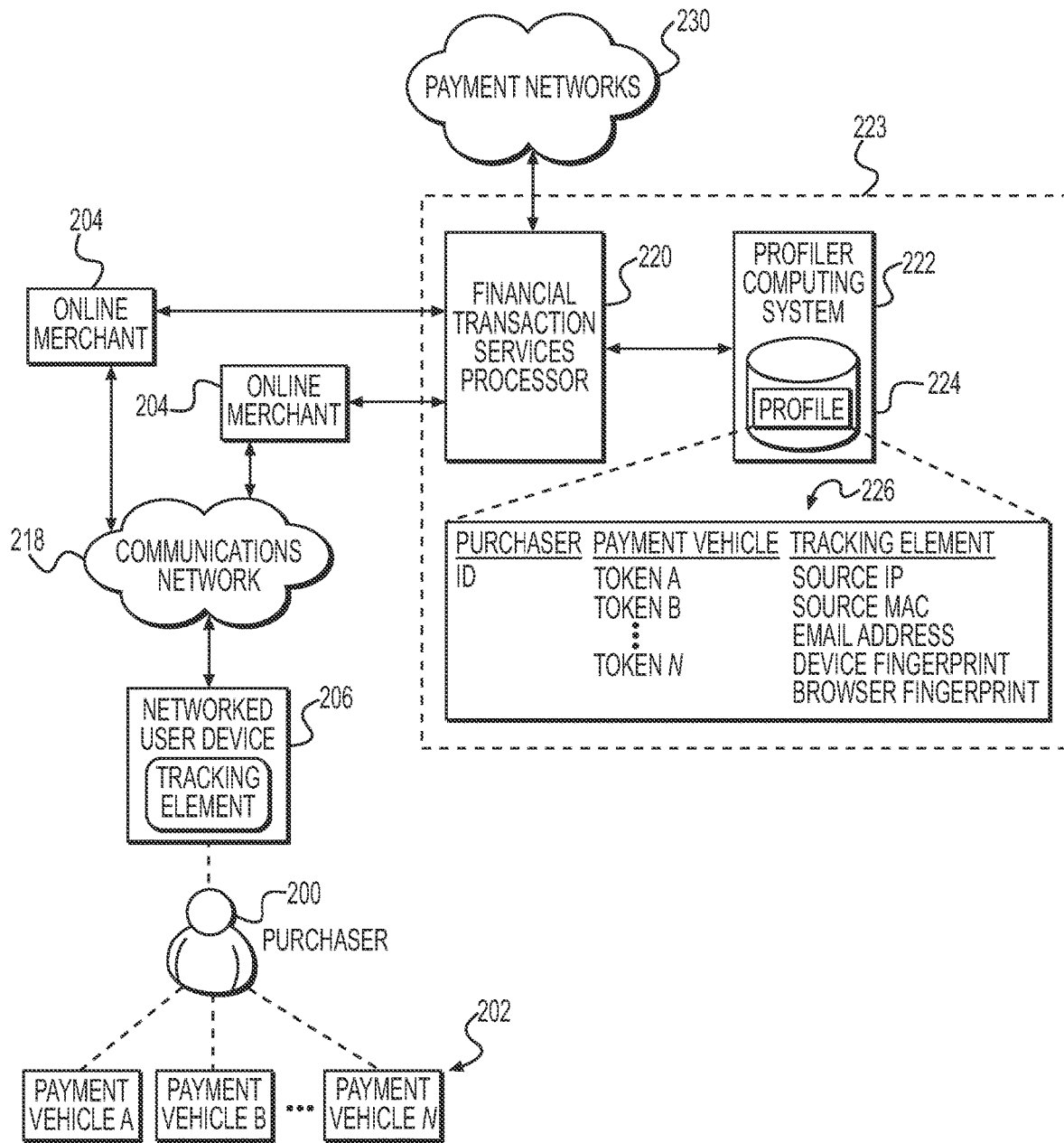
FIGS. 2A-2D depict example system diagrams in accordance with one non-limiting embodiment.
Figure 2B:
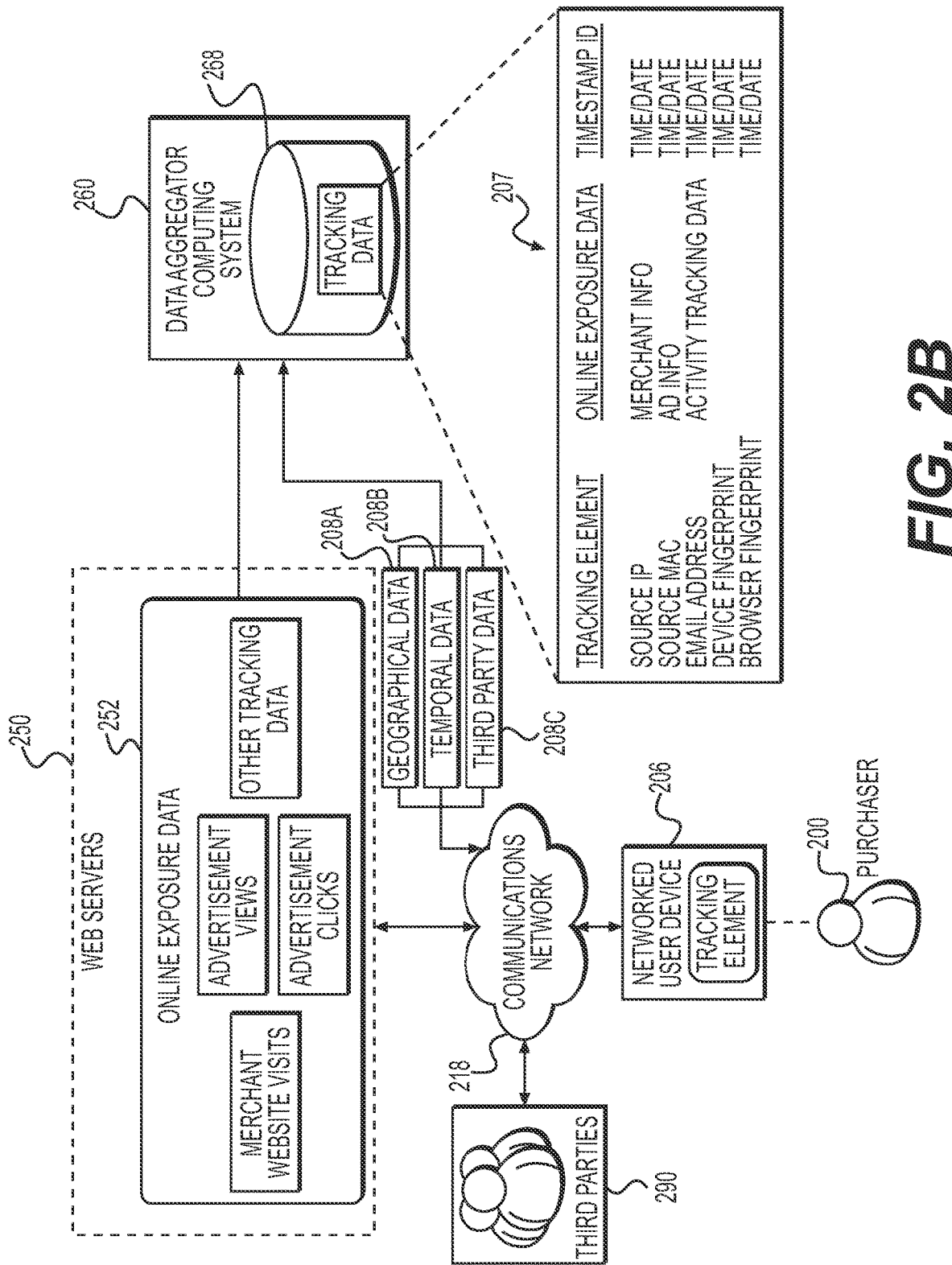
Figure 2C:
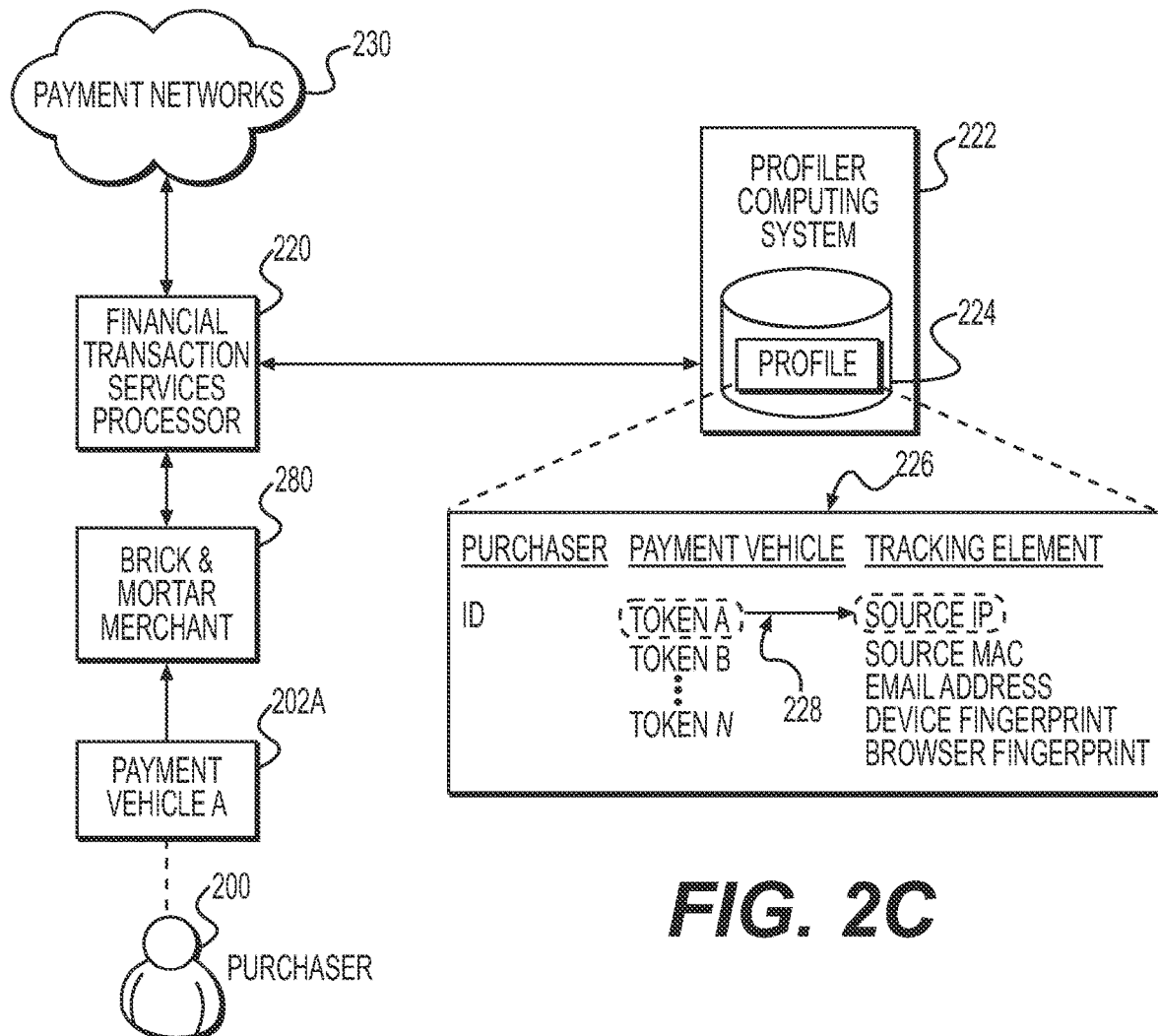
Figure 2D:
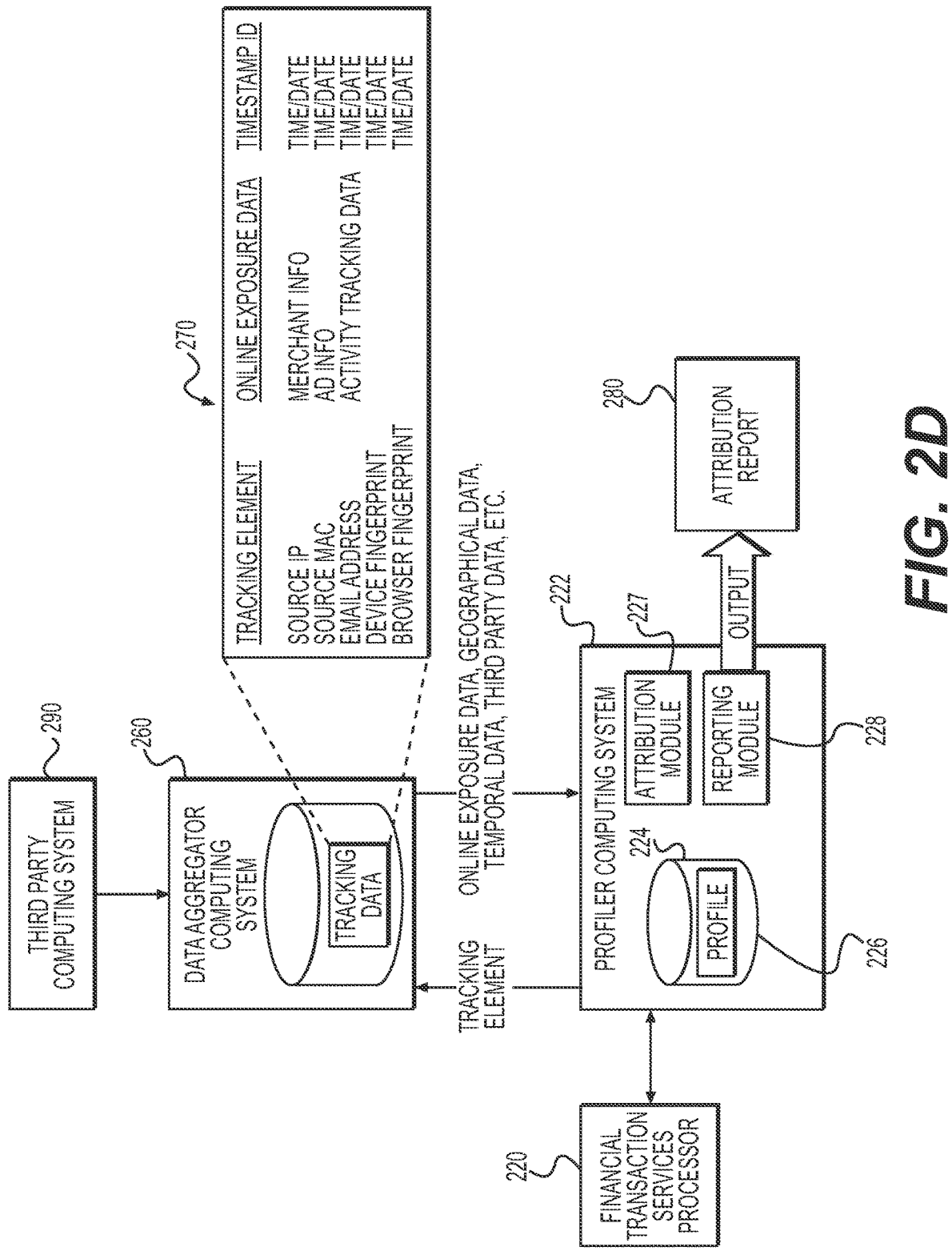

FIGS. 2A-2D depict example system diagrams in accordance with one non-limiting embodiment, with FIG. 2A schematically depicting profile building, FIG. 2B schematically depicting online tracking, FIG. 2C schematically depicting purchase tracking, and FIG. 2D schematically depicting attribution. Referring first to FIG. 2A, a purchaser 200 is shown that is associated with payment vehicles 202, which are depicted as Payment Vehicles A-N. As is to be appreciated, the payment vehicles 202 can include any type of payment vehicle that can be utilized to initiate a payment transaction. Unless otherwise specified herein, "payment vehicle" includes (1) a physical card including a plastic or paper card with a magnetic stripe, bar code or other indicator indicative of an account number or other account indicative information, and/or (2) a virtual card, such as a display or screenshot for a mobile phone or for another portable device (e.g., a flash drive, smart chip, a laptop or portable computer), or for a computer device (e.g., a desktop computer) in combination with data indicative of an account number or other account indicative information. Data associated with the cards may include an encrypted or unencrypted account number or other encrypted or unencrypted account indicative information and/or encrypted or unencrypted information associated with a particular card, issuer, creator, or group of merchants. It is also contemplated that the card may have multiple embodiments or forms. For example, the card may be a physical card (e.g., in the form of magnetic striped plastic card), a virtual card (e.g., in the form of a display on a smart phone), or both. In embodiments in which the card is a virtual card, the corresponding account information (e.g., account number) would initially be provided to the consumer and the consumer would communicate the account information to the merchant. The virtual card may be communicated by displaying a display or screenshot, and/or by transmitting a signal, such as by using NFC (Near Field Communication) technology or other secure transport technologies to complete the transaction with the selected merchant. Optionally, the virtual card may have a display element (e.g., a bar code or string of numbers) which identifies the account number associated with the card. Alternatively, the virtual card may have display elements relating to the merchants that accept the card. Thus, whether the card is physical or virtual, it communicates account information.

Still referring to FIG. 2A, the purchaser 200 utilizes a networked user device 206 to communicate with one or more online merchants 204 through a communications network 218 (e.g., the Internet, a secure network, etc.). The networked user device 206 can be any suitable computing device that facilitates network communications, such as, for example, a laptop computer, a tablet computer, a desktop computer, a smart television, a smart appliance, a mobile computing device, a gaming device, a wearable computing device, and so forth. When interacting with the online merchant 204, the networked user device 206 can be associated with a tracking element. The tracking element can be, for example, an IP address, a MAC address, a device fingerprint, a browser fingerprint, or a unique identifier associated with the networked user device 206. Additionally or alternatively, the tracking element can be an identifier associated with the purchaser 200. For example, in some embodiments, the tracking element can be embodied as, or otherwise include, an email address, a postal address, a phone number, a loyalty account number, a username, and/or any other unique identifier associated with the purchaser 200. Through a web browser executing on the networked user device 206 or through other specialized applications executing on the networked user device 206 (sometimes referred to as apps), the purchaser 200 can initiate purchase events with one or more of the online merchants 204. The online merchant 204 can present a payment interface (e.g., a payment screen, a POS, etc.) to the purchaser 200 in which information for one or more of the payment vehicles 202 is entered. The payment interface can, in turn, communicate with a financial transaction services processor 220 with appropriate authorization messaging. The financial transaction services processor 220 can communicate with various payment networks 230, to seek authorization for the purchase event at the online merchant 204. Information based on the transaction can also be provided to a profiler computing system 222. In some embodiments, the profiler computing system 222 can be a computing system separate from the financial transaction services processor 220 and operated by a separate entity. In other embodiments, the profiler computing system 222 is a component of the financial transaction services processor 220 and operated by the same entity, as indicated by dashed box 223. The information provided to the profiler computing system 222 can be used to build a profile 226 for the purchaser 200. The profile 226 can be stored in a profile data store 224. The profile data store 224 can be maintained by the profiler computing system 222, as is shown, maintained by the financial transaction services processor 220, or maintained by any other suitable device or entity, such as the data aggregator computing system 260 (FIG. 2B). The format and content of the profile 226 can vary, but generally the profile 226 provides a linkage of the payment vehicle(s) 202 used during a purchase event to a tracking element (e.g., device ID or purchaser ID) of the networked user device 206 and/or the purchaser 200. The payment vehicle information as stored in the profile 226 can be tokenized, as may be required by relevant data privacy standards. Over time, as the purchaser 200 makes additional purchases with the same or different payment vehicles 202 using the same or different networked user devices 206, the profile 226 can be updated accordingly. Furthermore, in some embodiments, the profile 226 can utilize house-holding techniques to link a plurality of different purchasers to the same networked user device 206 and/or the same collection of payment vehicles 202.

Referring now to FIG. 2B, the online activity of the purchaser 200 can be monitored and logged as part of the attribution techniques described herein. Using the networked user device 206 (or other computing device), the purchaser 200 can communicate with various web servers 250 over the communications network 218. The purchaser 200 can be performing any of a variety of online activities, such as a keyword searching, visiting a merchant's ecommerce website, activating a link on a banner advertisement, activating a link resulting from a search request, and so forth. Through these interactions, the purchaser 200 is generating online exposure data 252 that can be stored by a data aggregator computing system 260. The data aggregator computing system 260 can be a service provided by a third party, such as Google®, or the data aggregator computing system 260 can be a component of a merchant's ecommerce platform, for example. In some embodiments, the data aggregator computing system 260 may also receive and store data related to the geographical location of purchase event(s) (e.g., "geographical data" 208A), data related to the timing of the purchase event(s) (e.g., "temporal data" 208B), and/or transaction related data received from third parties 290 (e.g., stock keeping units and other departments of merchants, acquiring banks of merchants, etc.) ("third party data" 208C). In any event, the online exposure data 252, geographical data 208A, temporal data 208B, and third party data 208C can be linked to, or otherwise associated with, the particular tracking element (e.g., the device ID of the networked user device 206 and/or the purchaser ID of the purchaser 200) and entered into a tracking profile 270. The tracking profile 270 can be maintained in a data store 268. In some embodiments, the tracking data maintained by the tracking profile 270 is time stamped. Generally, the data aggregator computing system 260 can monitor and log the purchaser's 200 interactions with various online marketing campaigns, advertisements, and so forth.

Referring now to FIG. 2C, the purchaser 200 is depicted initiating a purchase event at a brick-and-mortar merchant 280 using their payment vehicle 202A. While a brick-and-mortar merchant 280 is shown in FIG. 2C, in other embodiments, the merchant 280 can be an online/ecommerce-based merchant (e.g., a brick-and-mortar retail location of one of the online merchants 204 illustratively shown in FIG. 2A). A POS of the merchant 280 can provide transaction information to the financial transaction services processor 220 using conventional payment transaction communications. The financial transaction services processor 220 can then communicate with payment networks 230, as may be needed, to seek authorization for the purchase event. The financial transaction services processor 220 can also provide information from the purchase event to the profiler computing system 222. In one embodiment, the information is based on the payment vehicle 202A. In other embodiments, alternate or additional information can be provided, such as the name of the purchaser 200, an email address of the purchaser 200, a postal address of the purchaser 200, a phone number of the purchaser 200, a username of the purchaser 200, and/or a loyalty card number of the purchaser 200. In use, the profiler computing system 222 can query the profile data store 224 using the information provided by the financial transaction services processor 220 to determine if a tracking element (e.g., a device ID or a purchaser ID) is affiliated or otherwise associated with the information. In the illustrated embodiment, affiliation 228 between "TokenA" and a "Source IP" address is identified in the profile 226.

Referring now to FIG. 2D, the profiler computing system 222 is shown providing the tracking element (e.g., the device ID or purchaser ID) to the data aggregator computing system 260 as a query. The data aggregator computing system may also receive data from a third party computing system 290. The data aggregator computing system 260 can, in turn, query the tracking profiles 270 in the data store 268 to determine if online exposure data, geographical data, temporal data, third-party data, etc., are affiliated with that tracking element. It is to be appreciated that in some embodiments, the tracking profiles 270 can be provided to the profiler computing system 222 in real-time or batch transfers so that the affiliation between a tracking element and any online exposure data, geographical data, temporal data, third-party data, etc., can be performed by the profiler computing system 222. In other embodiments, the tracking profiles 270 can be provided to the financial transaction services processor 220 in real-time or batch transfers so that the affiliation between a tracking element and any online exposure data, geographical data, temporal data, third-party data, etc., can be performed by the financial transaction services processor 220. In any event, the online exposure data, geographical data, temporal data, third-party data, etc., from the tracking profiles 270 can be provided to the profiler computing system 222 for further processing.

Figure 3:
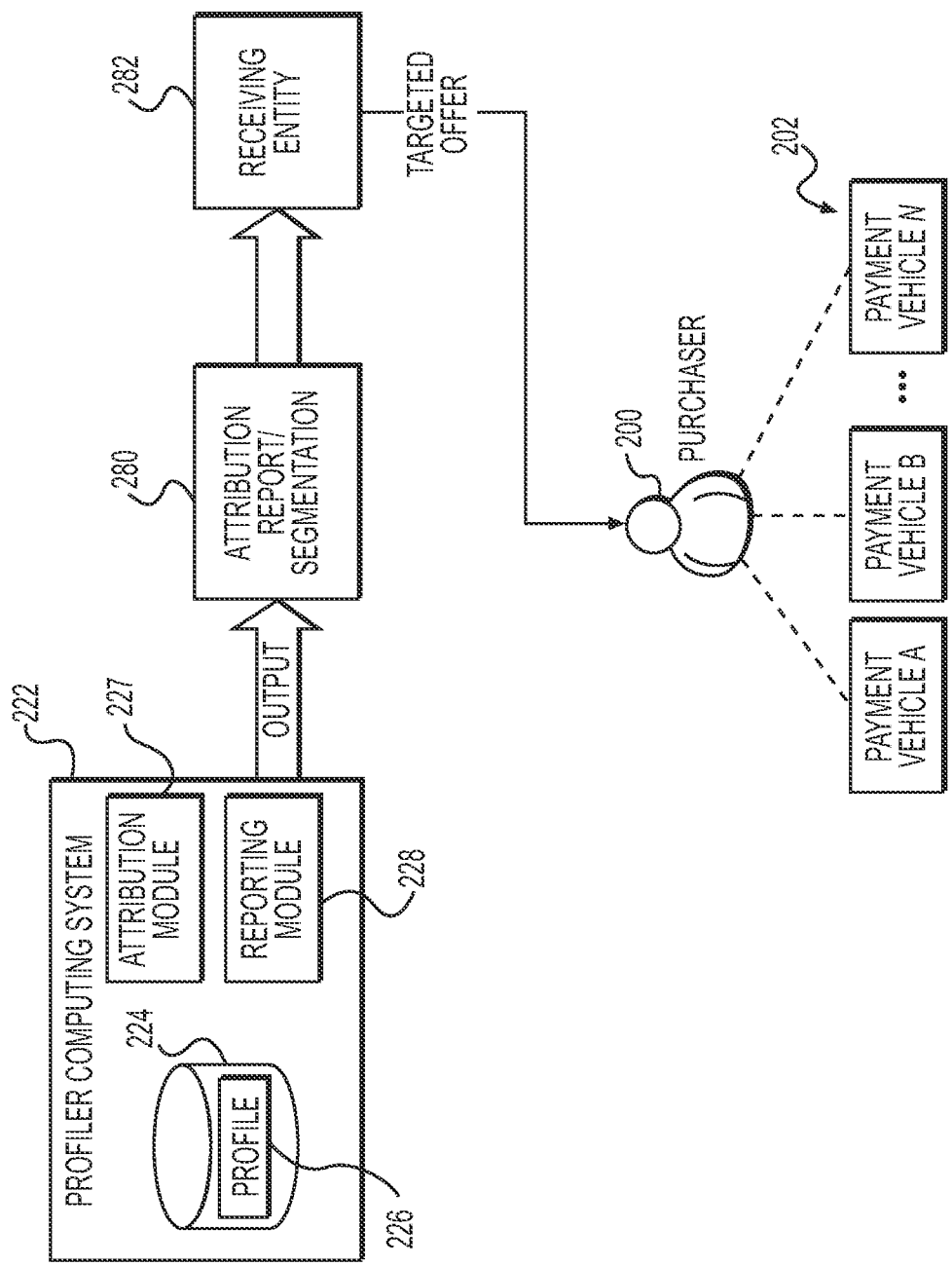
FIG. 3 depicts an example system diagram in which a receiving entity of an attribution report provides targeted offers to purchasers.

As shown in FIG. 3, an attribution module 227 of the profiler computing system 222 can map the online exposure data, geographical data, temporal data, third-party data, etc. gathered by the data aggregator computing system 260 to the purchase event at the brick-and-mortar merchant 280 (FIG. 2C). Various rules can be applied by the attribution module 227 to determine whether to map certain online exposure data, geographical data, temporal data, third-party data, etc., to the purchase event. Such rules can generally impact whether certain online exposure data will be linked to a subsequent purchase event. Once it is determined if a purchase event, or collection of purchase events, can be attributed to online activity of the purchaser 200, a reporting module 228 can output an attribution report 280 to a receiving entity 282. The receiving entity 282 can be, without limitation, the merchant 280, the data aggregator computing system 260, the financial transaction services processor 220, a marketing/advertisement entity, or any other interested party.

In some embodiments, the attribution report 280 can include market segmentations or other analytics, as may be useful the receiving entity 282. Using the segmentation or other market information provided in the attribution report 280, targeted offers can be provided to the purchaser 200, or grouping of purchasers. For example, the targeted offers can be directed to purchasers who visited particular website, purchasers who have certain types of payment vehicles, purchasers who visit particular merchants, or purchasers satisfying other segmentation parameters.

Figure 4:
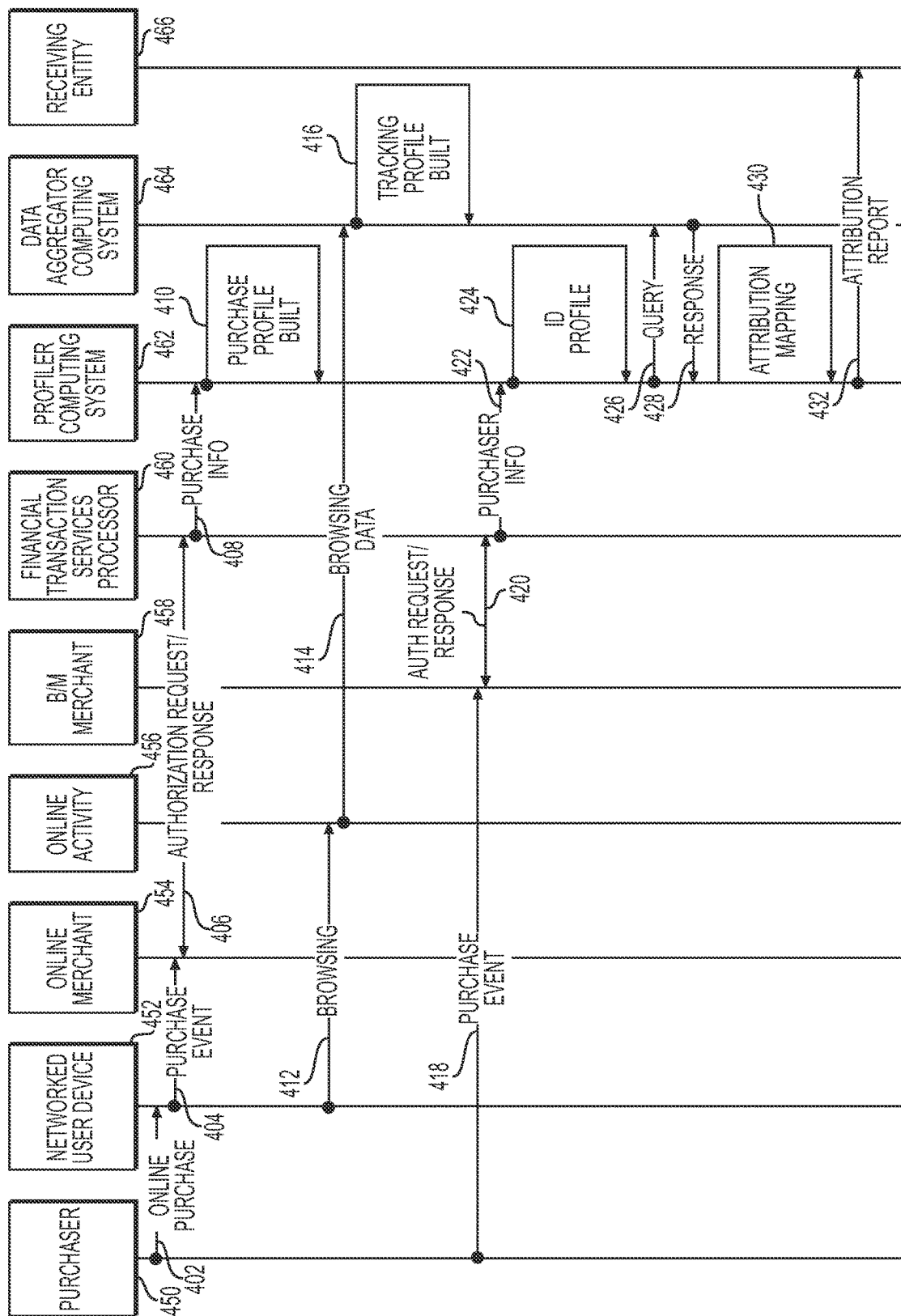
FIG. 4 is an example message sequent chart in accordance with one non-limiting embodiment.

FIG. 4 is an example message sequent chart in accordance with one non-limiting embodiment. As is to be appreciated, various entities or processes illustrated in FIG. 4 can be combined into single entities without departing from the scope of the present disclosure. Furthermore, the particular ordering of the messaging depicted in FIG. 4 is for illustration purposes only. An online purchase 402 is first initiated by a purchaser 450 on a networked user device 452. A purchase event 404 is then initiated at an online merchant 454. The online merchant 454 can then communicate with a financial transaction services processor 460 to transmit an authorization request 406 and receive a response 406. The financial transaction services processor 460 can also provide purchase information 408 to a profiler computing system 462. The purchase information 408 can include, for example, a tracking element (e.g., a device ID of the networked user device 452 or a purchaser ID of the purchaser 450) to the profiler computing system 462. Additionally, the purchase information 408 can include payment vehicle information. The profiler computing system 462 can then build a purchaser profile 410.

Internet-based browsing 412 can then occur through the networked user device 452 engaging in online activity 456. Browsing data 414 can be gathered by a data aggregator computing system 464. The data aggregator computing system 464 can build a tracking profile 416 based on the online activity 456 and/or offline activity based on, e.g., geographical data, temporal data, third-party data, etc., and a tracking element associated the networked user device 452 (e.g., a device ID) and/or a tracking element associated with the purchaser 450 (e.g., a purchaser ID).

Figure 6:
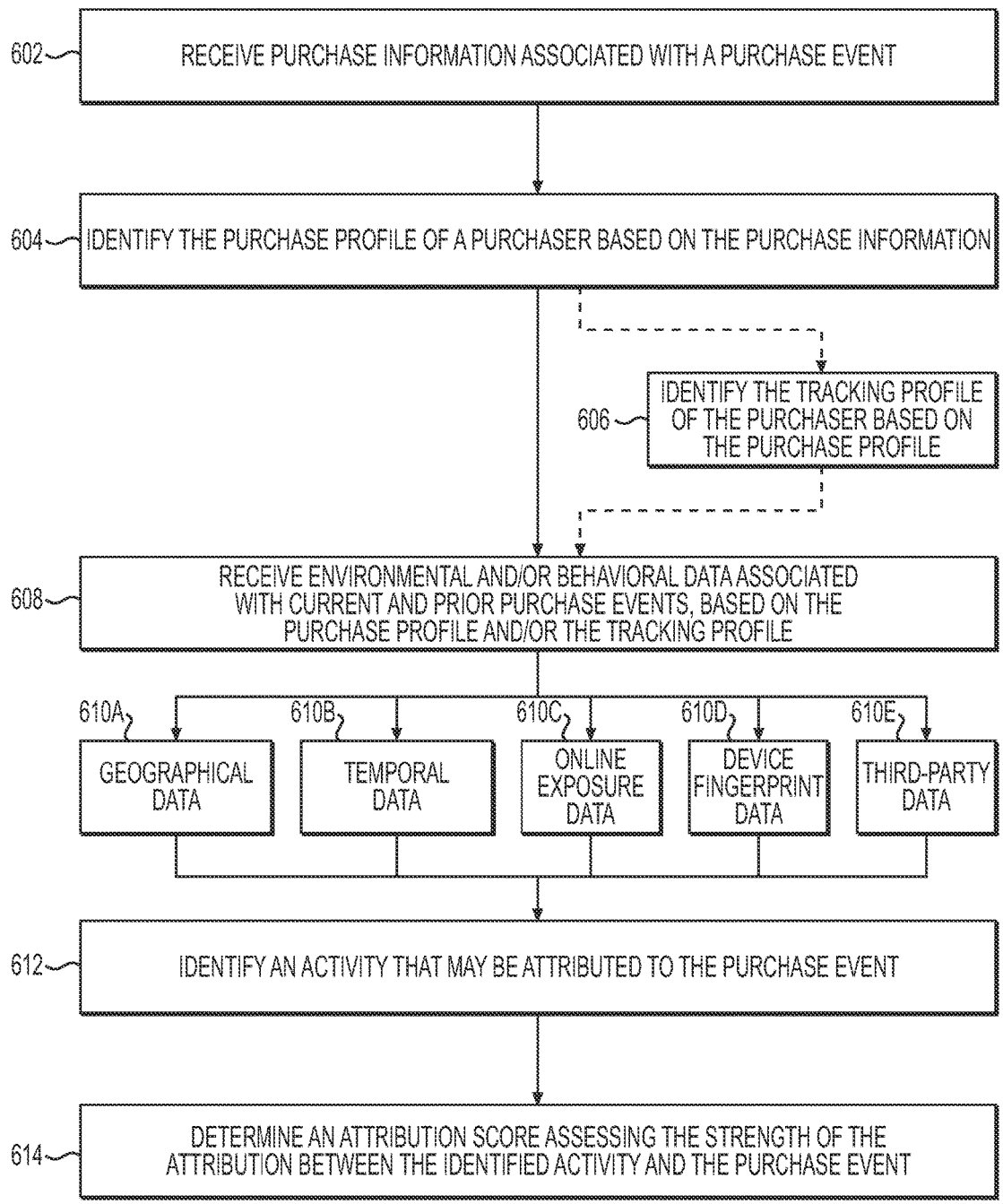
FIG. 6 is a flow chart depicting an example process for attributing a purchase event with an identified activity.

A subsequent purchase event 418 can then be initiated by the purchaser 450 at a brick-and-mortar merchant 458. During that purchase event, authorization communications 420 can occur between a POS of the merchant 458 and the financial transaction services processor 460. The financial transaction services processor 460 can provide purchase information 422 to the profiler computing system 462. The purchase information 422 can comprise, for example, payment vehicle information. The profiler computing system 462 can use the purchase information 422 to query the purchaser profiles to identify a purchaser profile 424 of the purchaser 450 and determine a particular tracking element (e.g., a device ID, a purchaser ID, etc.) linked or otherwise associated therewith. The tracking element can then be sent within a query 426 to the data aggregator computing system 464. The data aggregator computing system 464 can respond 428 with a report, which can include online exposure data, geographical data, temporal data, third-party data, etc., linked to that tracking element. In some embodiments, the data aggregator computing system 464 can respond with a message indicting that no online exposure data, geographical data, temporal data, third-party data, etc., are linked to the tracking element. The profiler computing system 462 can then attribute the subsequent purchase event 418 at the brick-and-mortar merchant 458 to an online activity 456 and/or an offline activity based on, e.g., geographical data, temporal data, third-party data, etc., through attribution mapping 430. An attribution report 430 can then be provided to a receiving entity 466. Method 600, as depicted in FIG. 6 provides a more detailed explanation of at least some embodiments of the process of attributing the subsequent purchase event 418 to an online activity 456 and/or an offline activity. For example, the attribution mapping may include identifying an online and/or offline activity that may be attributed to the subsequent purchase event (e.g., as in step 610 in method 600), and determining an attribution score assessing the strength of attribution between the subsequent purchase event 418 with the online activity 456 and/or offline activity (e.g., as in step 612 of method 600).

Figure 5:
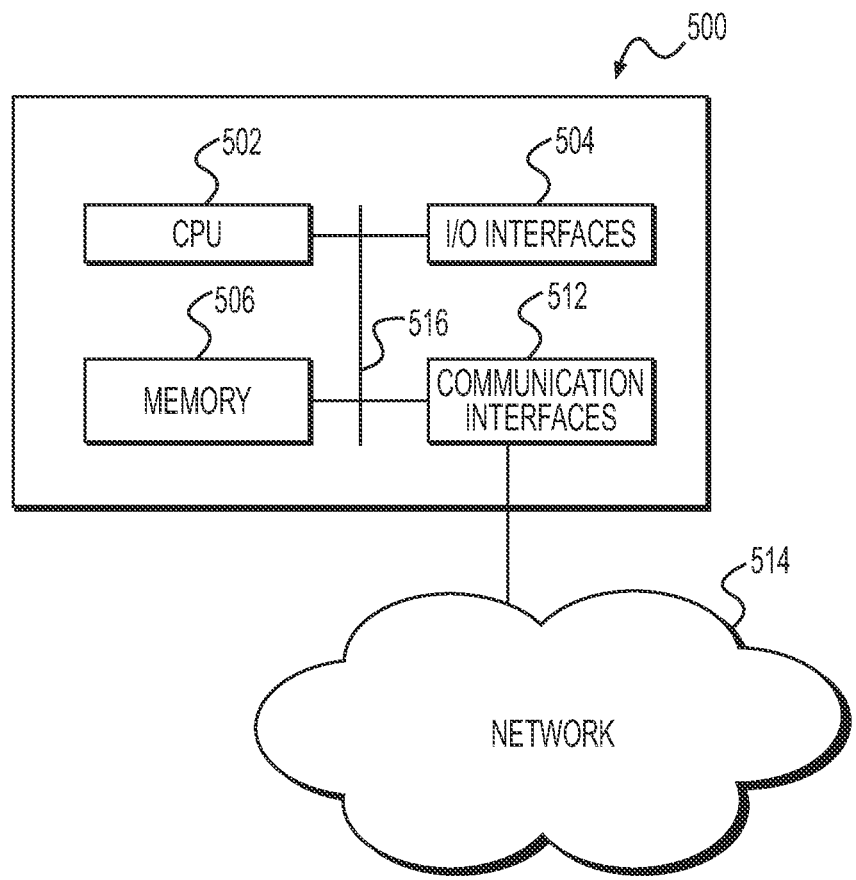
FIG. 5 depicts an example computing device.

The processes described above can be performed on or between one or more computing devices 500. Referring now to FIG. 5, an example computing device 500 is presented. A computing device 500 can be a server, a computing device that is integrated with other systems or subsystems, a mobile computing device, a cloud-based computing capability, and so forth. The computing device 500 can be any suitable computing device as would be understood in the art, including without limitation, a custom chip, an embedded processing device, a tablet computing device, a financial transaction services processor, a profiler computing system, a data aggregator computing system, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 500 includes a processor 502 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 500 also includes one or more memories 506, for example read only memory (ROM), random access memory (RAM), cache memory associated with the processor 502, or other memories such as dynamic RAM (DRAM), static RAM (SRAM), programmable ROM (PROM), electrically erasable PROM (EEPROM), flash memory, a removable memory card or disk, a solid state drive, and so forth. The computing device 500 also includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CDROM), Compact Disc Recordable (CD-R), Compact Disc Rewriteable (CD-RW), a suitable type of Digital Versatile Disc (DVD) or BluRay disc, and so forth. Storage media such as flash drives, solid state hard drives, redundant array of individual disks (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 512 can be configured to transmit to, or receive data from, other computing devices 500 across a network 514. The network and communication interfaces 512 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 512 can include wired data transmission links such as Ethernet and TCP/IP. The communication interfaces 512 can include wireless protocols for interfacing with private or public networks 514. For example, the network and communication interfaces 512 and protocols can include interfaces for communicating with private wireless networks such as a Wi-Fi network, one of the IEEE 802.11x family of networks, or another suitable wireless network. The network and communication interfaces 512 can include interfaces and protocols for communicating with public wireless networks 512, using for example wireless protocols used by cellular network providers, including Code Division Multiple Access (CDMA) and Global System for Mobile Communications (GSM). The computing device 500 can use network and communication interfaces 512 to communicate with hardware modules such as a database or data store, or one or more servers or other networked computing resources. Data can be encrypted or protected from unauthorized access.

In various configurations, the computing device 500 can include a system bus 516 for interconnecting the various components of the computing device 500, or the computing device 500 can be integrated into one or more chips such as programmable logic device or application specific integrated circuit (ASIC). The system bus 516 can include a memory controller, a local bus, or a peripheral bus for supporting input and output devices 504, and communication interfaces 512. Example input and output devices 504 include keyboards, keypads, gesture or graphical input devices, motion input devices, touchscreen interfaces, one or more displays, audio units, voice recognition units, vibratory devices, computer mice, and any other suitable user interface or device for receiving user inputs and/or outputting information.

The processor 502 and memory 506 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low level, object-oriented, visual, compiled, or interpreted programming language.

FIG. 6 is a flow chart depicting an example process 600 for attributing a purchase event with an identified activity. Process 600 may be performed by one or more of financial transaction services processor 220, profiler computing system 222, and/or data aggregator computing system 260.

Step 602 may include receiving purchase information associated with a purchase event. The purchase information may include transactional information, e.g., past transaction amounts, merchant identifiers (MID) of transactions, and/or data related to or identifying the payment methods and/or payment vehicles used in transactions, among other information. In some embodiments, the purchase information may include a tracking element (e.g., a device ID of the networked user device 452 or computing system of the purchaser, or a purchaser ID of the purchaser 450) to the profiler computing system 462.

Step 604 may include identifying the purchase profile of a purchaser based on the purchase information. For example, the financial transaction services processor 460 can provide the received purchase information 422 to the profiler computing system 462. The purchase information 422 can comprise, for example, payment vehicle information. The profiler computing system 462 can use the purchase information 422 to query the purchaser profiles stored within the profiler computing system 462 to identify a purchaser profile 424 of the purchaser 450.

In some embodiments, step 606 may include identifying the tracking profile of the purchaser based on the purchase profile. In such embodiments, the purchase information and/or the purchase profile may include a tracking element (e.g., a device ID, a purchaser ID, etc.). When the profiler computing system 462 uses the purchase information 422 to query the purchaser profiles stored within the profiler computing system 462 to identify a purchaser profile 424 of the purchaser 450, the profiler computing system 462 may also determine a particular tracking element (e.g., a device ID, a purchaser ID, etc.) linked or otherwise associated with the purchaser profile. The tracking element can then be sent within a query 426 to the data aggregator computing system 464. The data aggregator computing system 464 can respond 428 with a tracking profile. In some embodiments, the tracking profile may be a report, which may include online exposure data linked to the tracking element. As will be described below, the profiler computing system 462 may attribute a purchase event to an online activity 456 (or an activity associated with one or more environmental and/or behavioral data). The strength of the attribution may be based on an attribution score. An attribution report 430 may include such an attribution score and may be provided to a receiving entity 466.

Step 608 may include receiving environmental and/or behavioral data associated with the current and prior purchase events, based on the purchase profile and/or the tracking profile. In various embodiments, environmental and/or behavioral data associated with a purchase event may refer to, for example, characteristics related to the geographical location of purchase event(s) (e.g., "geographical data" 608A), characteristics related to the timing of the purchase event(s) (e.g., "temporal data" 608B), online exposure data of the purchaser 608C (e.g., as may be received from the tracking profile identified in step 606), fingerprint data associated with the networked user device 160 of the purchaser (e.g., "device fingerprint data" 608D), or third party data 608E.

The environmental and/or behavioral data associated with purchase events may be used to attribute purchaser's events to specific purchaser activities. e.g., using the data aggregator computing system 260. Moreover, in addition to online activity of the purchaser being monitored and logged as part of the attribution techniques described in FIG. 2B, environmental and/or behavioral data associated with purchase events of the purchaser may also be monitored and logged. Thus, the tracking profile may include, for example, geographical data regarding the location of the purchaser or the networked user device of the purchaser, temporal data regarding a purchase event, as well as third party data received from third parties. The tracking profile 270 can be maintained in a data store 268. In some embodiments, the tracking data maintained by the tracking profile 270 is time stamped. Generally, the data aggregator computing system 260 can monitor and log the purchaser's 200 interactions with various online marketing campaigns, advertisements, and so forth.

One form of environmental and/or behavioral data that may be used to attribute purchaser's events to specific purchaser activities is geographical data 608A. Through the understanding of consumer location, via both enhanced consumer profiling and prior offline purchase activity, the accuracy of attribution may be greatly increased as the confidence of specific consumer assignment to online activity is increased. Furthermore, geolocation and offline purchase activity attribution modeling may be better able to address transient behavior.

Another form of environmental and/or behavioral data that may be used to attribute purchaser's events to specific purchaser activities is temporal data 608B, which may include, for example, the duration of a purchase event, the time and date in which the purchase event was initiated (e.g., the purchaser begins browsing items at a store), and/or the time and date in which the transaction occurred, among other things. In some embodiments, online or mobile transactions may or may not have a durational component, as they are not constrained by typical retail hours. In such embodiments, other temporal data may be taken into account, (including time at which the transaction occurs).

Another form of environmental and/or behavioral data that may be used to attribute purchaser's events to specific purchaser activities is device fingerprinting data 608D, which may enable the identification and tracking of multiple networked user devices and/or computing systems. The networked user device and/or computer system of the purchaser may be identified and/or tracked using, for example, an IP address, an OS configuration, a static HTIP, browser and plug-in variables (balancing diversity and stability). Once the networked user device and/or computing systems of the purchaser have been identified and the online activities of the purchaser have been tracked, the networked user devices and/or computing systems may be associated with the purchaser profiles and/or profile computing system. The purchaser profile and/or profile computing system can be linked to the one or more payment methods and/or payment networks that the purchaser uses during purchase events. Device fingerprinting may allow for broader coverage and more accurate attribution of an activity to a purchase event as any given consumer can be appropriately associated with multiple devices and then associated with one or more payment methods and/or payment networks used at the purchase events. Thus, device fingerprinting may allow for a better correlation between online activity and offline purchase activity, e.g., via a preferred payment method and/or payment network.

Another form of environmental and/or behavioral data that may be used to attribute purchase events to specific purchaser activities is third party data 608E. Third party data may include, for example, purchase information for one or more purchase events, and may be received from a merchant, merchant department, a Stock Keeping Unit (SKU), etc. The third party data may allow for greater accuracy in attributing purchase events to specific purchaser activities. Such an embodiment requires partnership with third parties either to provide license to this data or the data itself to further enhance models.

Step 610 may include identifying an activity that may be attributed to the purchase event. The activities may include, for example, an exposure or engagement with an advertisement, a receipt of a marketing or promotional material, online activity, an entry into the premises of a merchant, the visibility of a merchant to a purchaser, among others.

Step 612 may include determining an attribution score assessing the strength of the attribution between the identified activity and the purchase event. The various environmental and/or behavioral data may be used, individually or in combination, to determine the attribution score. For example, the time between the online ad delivery to the purchaser's networked user device or the (purchaser's engagement with the delivered ad) and the actual offline purchase may yield a greater confidence in the attribution of the online ad delivery or engagement with the purchase, and may therefore yield a higher attribution score. Additionally, if between the online ad and the targeted purchase, the purchaser was exposed to other ads or performed other purchases within the same merchant category, the attribution score between the original online ad and purchase may be lower. Similarly, as time between an online activity and offline purchase increases, confidence in the attribution of the online activity to the offline purchase may also decrease, yielding a lower attribution score.

In some embodiments, additionally or alternatively, an attribution model may be generated. The attribution model may represent the strength of attribution of various one or more activities to a purchase event. In one embodiment, the attribution model may quantify the "halo" effect of online advertising. The halo effect may describe the unintended lift retailers may see base on a competitor's ad(s). The presently-disclosed techniques are as applicable to attribution and quantification of this Halo effect. In fact, sizing the halo effect may be an additional lever for retailers in ad optimization, e.g., by looking at the white space presented via the halo effect and tweaking ads to both maximize ad ROI while minimizing halo impact. In various embodiments, a halo effect may refer to the increase in sales of a good, service, and/or stock keeping unit of a merchant that is in a similar merchant category but is different from a merchant from whom a purchaser may have received or have been exposed to (e.g., by way of online marketing). In such embodiments, given extensive visibility in offline retail purchase activity, the attribution model may be used to measure the 'halo' effect or lift in sales and/or that a merchant, in a similar category, might see from a competitor's online ad.

The "halo" effect may be described in the following example. A purchaser receives or is exposed to an online ad promoting a certain category of a merchant (e.g., consumer electronics merchants) and/or a stock keeping unit SKU (e.g., a 4K HDTV). The ad itself may have been generated or be targeted towards purchasing from a specific merchant (e.g., "Retailer 1"). Subsequently, received purchase information or environmental and/or behavioral data indicates that the purchaser did in fact make a consumer electronics purchase (e.g., a 4K HDTV), but did not purchase it at Retailer 1. The received purchase information or environmental and/or behavioral data may indicate, however, that the purchaser made the purchase at a different consumer electronics merchant. In that scenario, there may be a correlation between the ad presentment and a subsequent purchase, which could indicate a leakage in advertising spend, for example.

In some embodiments, the profiler computing system 222, data aggregator computing system 260, data aggregator computing system 260, financial transaction services processor 220 (or computing devices thereof), payment networks 230 (or computing devices thereof), networked user device 206, online merchant 204 (or computing devices thereof), brick and mortar merchant 280 (or computing devices thereof), receiving entity 282 (or computing devices thereof), and web servers 250 can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described herein.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A method of attributing payment vehicle purchase events to activity, the method comprising:
   receiving, by a profiler computing system by way of a networked user device, purchase information associated with a completed purchase event of a purchaser using a payment vehicle;
   identifying, by a processor of the profiler computing system, a purchaser profile associated with the purchaser, the purchaser profile comprising payment vehicle data and a tracking element and wherein the identifying the purchaser profile comprises:
      accessing, using the processor of the profiler computing system, a database of the profiler computer system, wherein the database comprises a plurality of purchaser profiles and wherein each of the plurality of purchaser profiles comprises payment vehicle data and tracking element data;
      comparing, using the processor of the profiler computing system, the payment vehicle associated with the completed purchase event to the payment vehicle data of each of the plurality of purchaser profiles; and
      identifying, using the processor of the profiler computing system, the purchaser profile by identifying a match between the payment vehicle and the payment vehicle data of one of the plurality of purchaser profiles;
   generating, by an electronic transaction processor, one or more payment vehicle tokens based on the payment vehicle data;
   affiliating, by the processor of the profiler computing system, the tracking element of the identified purchaser profile to the one or more of payment vehicle tokens;
   generating, by the processor of the profiler computing system and based on data obtained from the tracking element affiliated with the one or more payment vehicle tokens, an attribution report that identifies that the completed purchase event is attributed to a non-purchase activity of the purchaser, wherein the non-purchase activity comprises interaction of the purchaser with an advertisement promoting a product category of a merchant; and
   quantifying, based on analysis of the attribution report by the processor of the profiler computing system, an influential effect of the advertisement, wherein the quantifying comprises:
      identifying, using the processor of the profiler computing system, that the completed purchase event corresponded to a product associated with the product category sold by another merchant; and
      determining, using the processor of the profiler computing system and based on attribution report, that the advertisement facilitated the completed purchase event of the product.

2. The method of claim 1, the method further comprising:
   receiving, by the profiler computing system, initial online purchase information associated with an initial online completed purchase event of the purchaser;

generating, by the profiler computing system, the purchaser profile associated with the purchaser based on the initial online purchase information;

storing, by the profiler computing system, the generated purchaser profile associated with the purchaser in the profile data store; and determining, by the processor of the profiler computing system, the strength of attributing the completed purchase event to the non-purchase activity of the purchaser based on the initial online purchase information.

3. The method of claim 1, further comprising:

requesting, by the profiler computing system and from a data aggregator computing system, environmental and/or behavioral data associated with the tracking element of the identified purchase profile; and receiving, by the profiler computing system and from the data aggregator computing system, the environmental and/or behavioral data associated with the tracking element of the identified purchase profile.

4. The method of claim 3, wherein the environmental and/or behavioral data received from the data aggregator computing system comprises one or more of:

geographical data of the purchaser;

temporal data of the purchaser;

online activity tracking data and electronic advertisement interaction data; and geographical, temporal, or online activity tracking data or electronic advertisement interaction data received from a third party.

5. The method of claim 3, wherein the environmental and/or behavioral data received from the data aggregator computing system comprises a message indicating that previous environmental and/or behavioral data associated with the tracking element is nonexistent.

6. The method of claim 3, wherein requesting the environmental and/or behavioral data comprises transmitting the tracking element to the data aggregator computing system.

7. The method of claim 1, further comprising:

analyzing, by the profiler computing system, the non-purchase activity of the purchaser as a function of environmental and/or behavioral data.

8. The method of claim 1, further comprising:

determining, by the profiler computing system, an attribution score based on the strength of attributing completed purchase event to the non-purchase activity of the purchaser; and determining whether to attribute the completed purchase event to the non-purchase activities of the purchaser based on determining whether the attribution score is above a predetermining threshold.

9. A system for attributing payment vehicle purchase events to previous activity of a purchaser, the system comprising:

a profiler computing device comprising a processor executing instructions stored in memory, wherein the instructions cause the processor to:

receive, by a profiler computing system by way of a networked user device, purchase information associated with a completed purchase event of a purchaser using a payment vehicle;

identify, by a processor of the profiler computing system, a purchaser profile associated with the purchaser, the purchaser profile comprising payment vehicle data and a tracking element and wherein the identifying the purchaser profile comprises:

accessing, using the processor of the profiler computing system, a database of the profiler computer system, wherein the database comprises a plurality of purchaser profiles and wherein each of the plurality of purchaser profiles comprises payment vehicle data and tracking element data;

comparing, using the processor of the profiler computing system, the payment vehicle associated with the completed purchase event to the payment vehicle data of each of the plurality of purchaser profiles; and identifying, using the processor of the profiler computing system, the purchaser profile by identifying a match between the payment vehicle and the payment vehicle data of one of the plurality of purchaser profiles;

generate, by an electronic transaction processor, one or more payment vehicle tokens based on the payment vehicle data;

affiliate, by the processor of the profiler computing system, the tracking element of the identified purchaser profile to the one or more of payment vehicle tokens;

generate, by the processor of the profiler computing system and based on data obtained from the tracking element affiliated with the one or more payment vehicle tokens, an attribution report that identifies that the completed purchase event is attributed to a non-purchase activity of the purchaser, wherein the non-purchase activity comprises interaction of the purchaser with an advertisement promoting a product category of a merchant; and quantify, based on analysis of the attribution report by the processor of the profiler computing system, an influential effect of the advertisement, wherein the quantifying comprises:

identifying, using the processor of the profiler computing system, that the completed purchase event corresponded to a product associated with the product category sold by another merchant; and determining, using the processor of the profiler computing system and based on attribution report, that the advertisement facilitated the completed purchase event of the product.

10. The system of claim 9, wherein the instructions further cause the processor to:

receive, by the profiler computing system, initial online purchase information associated with an initial online completed purchase event of the purchaser;

generate, by the profiler computing system, the purchaser profile associated with the purchaser based on the initial online purchase information;

store, by the profiler computing system, the generated purchaser profile associated with the purchaser in the profile data store; and determine, by the processor of the profiler computing system, the strength of attributing the completed purchase event to the non-purchase activity of the purchaser based on the initial online purchase information.

11. The system of claim 9, wherein the instructions further cause the processor to:

request, by the profiler computing system and from a data aggregator computing system, environmental and/or behavioral data associated with the tracking element of the identified purchase profile; and receive, by the profiler computing system and from the data aggregator computing system, the environmental and/or behavioral data associated with the tracking element of the identified purchase profile.

12. The system of claim 11, wherein the environmental and/or behavioral data received from the data aggregator computing system comprises one or more of:
geographical data of the purchaser;
temporal data of the purchaser;
online activity tracking data and electronic advertisement interaction data; and
geographical, temporal, or online activity tracking data or electronic advertisement interaction data received from a third party.

13. The system of claim 11, wherein the environmental and/or behavioral data received from the data aggregator computing system comprises a message indicating that previous environmental and/or behavioral data associated with the tracking element is nonexistent.

14. The system of claim 11, wherein requesting the environmental and/or behavioral data comprises transmitting the tracking element to the data aggregator computing system.

15. The system of claim 9, wherein the instructions further cause the processor to:
analyze, by the profiler computing system, the non-purchase activity of the purchaser as a function of environmental and/or behavioral data.

16. The system of claim 9, wherein the instructions further cause the processor to:
determine, by the profiler computing system, an attribution score based on the strength of attributing completed purchase event to the non-purchase activity of the purchaser; and
determine whether to attribute the completed purchase event to the non-purchase activities of the purchaser based on determining whether the attribution score is above a predetermining threshold.

17. A non-transitory machine-readable medium stores instructions that, when executed by a profiler computing system, causes the profiler computing system to perform a method for attributing payment vehicle purchase events to previous activity of a purchaser, the method comprising:
receiving, by a profiler computing system by way of a networked user device, purchase information associated with a completed purchase event of a purchaser using a payment vehicle;
identifying, by a processor of the profiler computing system, a purchaser profile associated with the purchaser, the purchaser profile comprising payment vehicle data and a tracking element and wherein the identifying the purchaser profile comprises:
accessing, using the processor of the profiler computing system, a database of the profiler computer system, wherein the database comprises a plurality of purchaser profiles and wherein each of the plurality of purchaser profiles comprises payment vehicle data and tracking element data;
comparing, using the processor of the profiler computing system, the payment vehicle associated with the completed purchase event to the payment vehicle data of each of the plurality of purchaser profiles; and
identifying, using the processor of the profiler computing system, the purchaser profile by identifying a match between the payment vehicle and the payment vehicle data of one of the plurality of purchaser profiles;
generating, by an electronic transaction processor, one or more payment vehicle tokens based on the payment vehicle data;
affiliating, by the processor of the profiler computing system, the tracking element of the identified purchaser profile to the one or more of payment vehicle tokens;
generating, by the processor of the profiler computing system and based on data obtained from the tracking element affiliated with the one or more payment vehicle tokens, an attribution report that identifies that the completed purchase event is attributed to a non-purchase activity of the purchaser, wherein the non-purchase activity comprises interaction of the purchaser with an advertisement promoting a product category of a merchant; and
quantifying, based on analysis of the attribution report by the processor of the profiler computing system, an influential effect of the advertisement, wherein the quantifying comprises:
identifying, using the processor of the profiler computing system, that the completed purchase event corresponded to a product associated with the product category sold by another merchant; and
determining, using the processor of the profiler computing system and based on attribution report, that the advertisement facilitated the completed purchase event of the product.

18. The non-transitory machine-readable medium of claim 17, the method further comprising:
receiving, by the profiler computing system, initial online purchase information associated with an initial online completed purchase event of the purchaser;
generating, by the profiler computing system, the purchaser profile associated with the purchaser based on the initial online purchase information;
storing, by the profiler computing system, the generated purchaser profile associated with the purchaser in the profile data store;
determining, by the processor of the profiler computing system, the strength of attributing the completed purchase event to the non-purchase activity of the purchaser based on the initial online purchase information;
analyzing, by the profiler computing system, the non-purchase activity of the purchaser as a function of environmental and/or behavioral data;
determining, by the profiler computing system, an attribution score based on the strength of attributing completed purchase event to the non-purchase activity of the purchaser; and
determining whether to attribute the completed purchase event to the non-purchase activities of the purchaser based on determining whether the attribution score is above a predetermining threshold.

19. The non-transitory machine-readable medium of claim 17, the method further comprising:
requesting, by the profiler computing system and from a data aggregator computing system, environmental and/or behavioral data associated with the tracking element of the identified purchase profile;
receiving, by the profiler computing system and from the data aggregator computing system, the environmental and/or behavioral data associated with the tracking element of the identified purchase profile; and
requesting the environmental and/or behavioral data comprises transmitting the tracking element to the data aggregator computing system.

20. The non-transitory machine-readable medium of claim 17, wherein the environmental and/or behavioral data received from the data aggregator computing system comprises one or more of:

geographical data of the purchaser;
temporal data of the purchaser;
online activity tracking data and electronic advertisement interaction data;
geographical, temporal, or online activity tracking data or electronic advertisement interaction data received from a third party; and
a message indicating that previous environmental and/or behavioral data associated with the tracking element is nonexistent.

* * * * *